Patented Sept. 26, 1939

2,174,051

UNITED STATES PATENT OFFICE 2,174,051

HYDRAULIC CEMENT

Kaspar Winkler, Lugano-Crocifisso, Casa Crocifisso, Switzerland

No Drawing. Application May 17, 1933, Serial No. 671,521. In Germany May 23, 1932

35 Claims. (Cl. 106—27)

This invention has reference to a treatment by which the valuable properties of mortars and cements, particularly hydraulic cements and mortars, as well as of mixtures thereof, such as concrete, beton and the like, may be considerably improved, the period of setting and of solidification may be controlled and the strength and resistibility against water may be increased, while at the same time the important object of considerably reducing the water used in the mixing of cement and the preparation of beton or concrete is accomplished, and the danger of washing away the cement or important ingredients thereof is practically eliminated. Broadly considered the invention comprises the treatment of the class of binding agents referred to with hydroxylated organic acid compounds, preferably containing aliphatic radicals which, even when used in rather small amounts possess the property of influencing and modifying the colloidal properties of the suspensoids or other colloidal mixtures produced in the preparation of the binding mixtures used for masonry and similar or equivalent purposes by the use of mortars, hydraulic cements and the like. In further pursuance of my invention the valuable properties of these agents may be varied and improved to suit their various uses and applications by the further additions of particularly inorganic salt combinations, mostly of neutral or acid character by means of which the colloidal properties of the mixtures obtained in the presence of the hydroxylated acid compounds first mentioned may be regulated and modified in such a manner that better, more easily controllable and more delicate variations may be obtained than it is possible to produce by the ordinary mixing of various quantities of the ingredients of the binding agents referred to.

Various suggestions have already been made heretofore to obtain mortars and concrete of high strength, imperviousness to water and minimum contraction combined with the desired degree of plasticity for working and moulding, and showing but a minimum of volume change and fading in the finished product, a maximum of adhesive and weather resisting properties and of resistance against tension and pressure, and freedom from efflorescence and undesired reduction of strength, but great difficulty has been experienced in satisfying all of these requirements. It has been ascertained that most of these various properties are controlled by the so-called "water-cement-factor" of the compound and that the reduction of this factor would produce a particularly favorable influence upon the valued permanent properties of the class of material referred to, but there was the difficulty that the plasticity and workability of the compound was sometimes undesirably interfered with. Another difficulty arises from the fact that, at the place where the beton or cement is to be used, stated amounts of the various ingredients are to be employed and the regulation and modification of properties has to be attempted by the addition of water, which is entirely unsatisfactory.

Now these difficulties may be overcome and a regulation of the properties of the concrete, beton, cement and similar binding agents may be obtained by the presence of certain substances adapted to modify the colloidal properties of the paste-like, aqueous suspensions and suspensoids which constitute the otherwise ready-mixed mortars, betons and concretes, so that a degree of fluidity is produced by these agents which would otherwise be obtainable only by increasing the amount of water unduly. In this connection however those dispersing and fluidity modifying agents, which produce foams, are not adapted for the purposes of this invention in view of the great amount of air entrapped by such foams. I use with preference organic acid compounds, such as organic acids, their salts and derivatives which contain one or more carboxylic groups together with a plurality of hydroxyl-groups of which latter at least two hydroxy-groups are combined by aliphatic groups of radicals, and it should be pointed out that moreover the unexpected result is accomplished that comparatively small amounts of these substances are necessary to produce the liquefaction. Ordinarily an amount of about one percent (1%) of the amount of mortar or hydraulic cement employed has been found sufficient for the purpose, the amount of water required for approximately the same degree of fluidity being reduced about twenty (20) percent and more. As illustrative examples may be mentioned tartaric acids and tartar, citric acid, saccharic acid, hydroxylated adipic acid (tetra-hydroxy-adipic acid) and similar acids and their salts. These substances do not produce a foam and a general characteristic feature of all these substances is that in the free state they possess a relatively stronger acid group and one or more less acid groups, so that these substances are capable of forming, for instance, at least two salts of the alkaline earths with different pH-values.

Substances, such as albumins, albumin decomposition products, compounds of albumin with alkalis, soaps of fatty acids, oils, bitumens, tars, naphthalene soaps and natural glucosides adapted to produce foams and to thereby influence the colloidal properties of the mortars, beton and the like have the property of considerably reducing the surface-tension of the suspension-agent (in the mixing water), the solid phase being precipitated on the surface of the foams and becoming gradually enriched thereby. Such tension reducing substances are almost exclusively so-called polar organic substances the molar spatial extension of which corresponds to at least 4 C (carbon)-spaces in the molecule and the polar properties of which are due to asymmetrically arranged hydrophile radical. However in a great many cases such substances produce a reduction of the strength of the mortar, hydraulic cement or beton mixed therewith. When used in conjunction with the substances contemplated by this invention, the strength and the imperviousness of the concrete, beton and mortar against moisture are increased.

*Example.*—As an exemplification of the use of hydroxylated acid product I may mention the following procedure:

A mixture of concrete or beton of 1 (one) part by weight of hydraulic cement and 8 parts of sand-gravel is mixed with a solution of 0.0015 part by weight of tetra-hydroxy-adipic acid

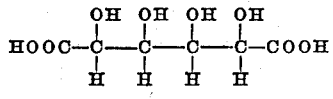

in 0.5 part by weight of water; a soft readily workable beton mixture is obtained thereby.

The amount of the additions referred to varies as a rule between 1 and 2 parts per thousand parts of solid substance and relatively to the weight of the hydraulic cement employed. For special purposes this amount of addition may be decreased to less than 0.1%, such as to 0.01%, 0.05%, etc., or increased to 2 (two) percent. The manner of action of the additions mentioned in regard to the strength and the imperviousness of the product may be determined in a reliable and comparatively simple manner, but the determination of the plasticity causes some difficulty on account of the lack of homogeneity. But by means of the otherwise well known slump-test or setting test, and the flow-test or spreading test and by similar reactions the reduction of the water-cement-factor heretofore mentioned may be ascertained. In a variety of such tests a reduction of the addition of water of about 15 to 20 percent necessary for mortar and hydraulic cement has been consistently observed. This reduction of the water-cement-factor results, of course, in the production of various important advantages. A very considerable increase of the strength of the mortar or beton or concrete is obtained along with a maximum of imperviousness and adhesiveness, freedom from efflorescence and the like. On the other hand, the requirements of slow setting and rapid hardening properties are most favorably combined in the product, so as to make it possible to detach the moulds from moldable units of masonry at an early date without any working joints becoming visible. With the proper additions, according to this invention, it is even possible to secure a much higher strength with the same amount of water which would be necessary to produce concrete, beton, etc., without the additions and having the same consistency and workability as the concrete, beton, etc. made in accordance with this invention. This fact is due to the catalytical acceleration of the process of re-crystallization.

The favorable, important result of the treatment with hydroxy-carbonic acids and their compounds and particularly the retardation of the setting stage thereby produced may be controlled and modified and may even be avoided by additions of oxydizing agents, such as per-manganate, chromates, bichromate, chlorates and the like or by the addition of other kinds of hydraulic binding agents, such as for instance of 1 to 2% aluminous cement as an addition to Portland-cement, without thereby interfering with the other favorable results obtained by the treatment with hydroxy-acids.

A further important improvement and a modification of the properties of the beton and the like may be produced by a further addition of phosphates of alkali which have the property of producing a similar influence upon the properties of hydraulic binding agents as that obtained by the use of hydroxy-acids. An addition of 0.5 percent of sodium-phosphate ($Na_2HPO_4$) calculated on the weight of the hydraulic cement, will for instance reduce the amount of water required 5 percent, while by an addition of about 0.2 percent potassium-tartrate the amount of water required will be reduced twelve (12) percent.

Other additions which may be used with advantage are compounds or substitution products of sesqui-oxides with fluorine or with oxalic acid in soluble or readily sprayable condition, such as for instance potassium-aluminium-fluoride, aluminium-oxalate, potassium-iron-oxalate and the like. The effects of these substances are particularly favorable when used in connection with such substances which are adapted to produce rapid setting and great strength and increased chemical resistibility. Thus the solvent for the additions mentioned may comprise a mixture of aluminate of potash in solution with carbonate of alkali with a specific gravity of about 1.1. This mixture possesses the property of not only shortening the setting period most considerably, but to greatly increase the initial strength and to greatly increase the adhesive properties of the hydraulic cement, mortar or beton treated in this manner. A similar result cannot be produced by the use of the individual components alone.

*Example II.*—By way of exemplification of the mode of treatment with the substances last referred to the following procedure may be employed. 6 parts of potassium-carbonate and 4 parts of aluminate of potash are dissolved in a sufficient amount of water to produce a solution of a specific gravity of 1.09. Then an amount of 0.5% of precipitated potassium-aluminium fluoride, 0.2% pulverized tartar and 0.25 percent of dry, kiln-dried Weldon-mud are added to the solution and the liquid is mixed with the hydraulic cement. The solution may also be employed as the mixing agent for mortar either as such or still further diluted; thus for instance, the solution may be diluted with three times the amount of water and use the liquid with a mixture of one part of Portland-cement and 2 parts of sand, which results in the production of a rapidly setting mortar. This kind of mortar, owing to its high adhesive qualities, is very well adapted for use in the mortar-spraying and distributing process.

It should be understood that the invention in its broad features is not restricted to the means, ingredients and proportions hereinbefore referred to merely by way of exemplification, but it is susceptible of other methods of applications and further modifications and changes are possible within the purview of this application, except as otherwise appears from the appended claims.

It is to be understood that the expression "acid compound" or equivalent terminology employed in the claims is intended to cover organic acids, their salts and derivatives, as hereinbefore set forth.

I claim:

1. The process of treating mortar-like binding agents to reduce the water-cement factor thereof which comprises treating such agents, in the presence of potassium-aluminium fluoride, with an organic hydroxylated carboxylic acid compound containing aliphatic radicals to increase the fluidity of the suspensoids without producing foam.

2. The process of treating mortar-like binding agents to reduce the water-cement factor thereof which comprises treating such agents, in the presence of potassium-aluminium fluoride, with an organic hydroxylated carboxylic acid compound containing aliphatic radicals and at least two hydroxy groups in the nucleus to increase the fluidity of the suspensoids without producing foam.

3. The process of treating mortar-like binding agents to reduce the water-cement factor thereof which comprises treating such agents, in the presence of potassium-aluminium fluoride, with organic carboxylic acid compounds of aliphatic substances containing at least two hydroxy groups in the nucleus and capable of producing at least two salts of the alkaline earth metals with different pH values to increase the fluidity of the suspensoids without producing foam.

4. The process of treating mortar-like binding agents to reduce the water-cement factor thereof which comprises treating such agents, in the presence of potassium-aluminium fluoride, with up to approximately 2% by weight, based on the hydraulic cement, of an organic hydroxylated carboxylic acid compound containing aliphatic radicals to increase the fluidity of the suspensoids without producing foam.

5. The process of treating mortar-like binding agents to reduce the water-cement factor thereof which comprises treating such agents, in the presence of potassium-aluminium fluoride, with up to approximately 2% by weight, based on the hydraulic cement, of an organic hydroxylated carboxylic acid compound containing aliphatic radicals and at least two hydroxy groups in the nucleus to increase the fluidity of the suspensoids without producing foam.

6. The process of treating mortar-like binding agents to reduce the water-cement factor thereof which comprises treating such agents, in the presence of potassium-aluminium fluoride, with up to approximately 2% by weight, based on the hydraulic cement, of organic carboxylic acid compounds of aliphatic substances containing at least two hydroxy groups in the nucleus and capable of producing at least two salts of the alkaline earth metals with different pH values to increase the fluidity of the suspensoids without producing foam.

7. The process of treating mortar-like binding agents which comprises treating said agents with tetra-hydroxy-adipic acid to increase the fluidity of the suspensoids.

8. The process of treating mortar-like binding agents which comprises treating said agents with up to approximately 2% by weight, based on the hydraulic cement, of tetra-hydroxy-adipic acid to increase the fluidity of the suspensoids.

9. Mortar-like binding agents containing up to approximately 2% by weight, based on the hydraulic cement, of an organic hydroxylated carboxylic acid compound containing aliphatic radicals to increase the fluidity of the suspensoids without producing foam, and having a water-cement factor approximately 15%–20% less than that of mortars and like binding agents prepared without the said carboxylic acid compound.

10. Mortar-like binding agents containing up to approximately 2% by weight, based on the hydraulic cement, of an organic hydroxylated carboxylic acid compound containing aliphatic radicals and at least two hydroxy groups in the nucleus to increase the fluidity of the suspensoids without producing foam, and having a water-cement factor approximately 15%–20% less than that of mortars and like binding agents prepared without the said carboxylic acid compound.

11. Mortar-like binding agents containing up to approximately 2% by weight, based on the hydraulic cement, of carboxylic acid compounds of aliphatic substances containing at least two hydroxy groups in the nucleus and capable of producing at least two salts of the alkaline earth metals with different pH values to increase the fluidity of the suspensoids without producing foam, and having a water-cement factor approximately 15%–20% less than that of mortars and like binding agents prepared without the said carboxylic acid compounds.

12. Mortar-like binding agents containing tetra-hydroxy-adipic acid to increase the fluidity of the suspensoids and having a water-cement factor approximately 15% to 20% less than that of mortars and like binding agents prepared without the organic dispersing agent.

13. Mortar-like binding agents containing up to approximately 2% by weight, based on the hydraulic cement, of tetra-hydroxy-adipic acid to increase the fluidity of the suspensoids and having a water-cement factor approximately 15% to 20% less than that of mortars and like binding agents prepared without the organic dispersing agent.

14. The process of treating mortar-like binding agents to reduce the water-cement factor thereof, which consists in increasing the fluidity of the suspensoids thereof by treating said binding agents in the presence of an oxidizing agent with a non-foaming organic hydroxylated acid compound containing aliphatic groups in the nucleus.

15. The process of treating mortar-like binding agents to reduce the water-cement factor thereof, which consists in increasing the fluidity of the suspensoids thereof by treating said binding agents in the presence of an oxidizing agent with a non-foaming organic carboxylic acid compound containing at least two hydroxy groups combined by aliphatic groups in the nucleus.

16. The method of treating mortar-like binding agents to reduce the water-cement factor thereof, which consists in increasing the fluidity of the suspensoids thereof by treating said binding agents in the presence of an oxidizing agent with a non-foaming organic carboxylic acid compound containing aliphatic groups and at least two hydroxy groups in the nucleus and capable of producing at least two salts of the alkaline earths with different pH values.

17. The process of treating mortar-like binding agents to reduce the water-cement factor thereof, which consists in increasing the fluidity of the suspensoids thereof by treating said binding agents in the presence of oxalates with a non-foaming organic hydroxylated acid compound containing aliphatic groups in the nucleus.

18. The process of treating mortar-like binding agents to reduce the water-cement factor thereof, which consists in increasing the fluidity of the suspensoids thereof by treating said binding agents in the presence of oxalates with a non-foaming organic carboxylic acid compound containing at least two hydroxy groups combined by aliphatic groups in the nucleus.

19. The method of treating mortar-like binding agents to reduce the water-cement factor thereof, which consists in increasing the fluidity of the suspensoids thereof by treating said binding agents in the presence of oxalates with a non-foaming organic carboxylic acid compound containing aliphatic groups and at least two hydroxy groups in the nucleus and capable of producing at least two salts of the alkaline earths with different pH values.

20. The process of treating mortar-like binding agents to reduce the water-cement factor thereof, which consists in increasing the fluidity of the suspensoids thereof by treating said binding agents with up to approximately 2% by weight, based on the weight of the hydraulic cement, of a non-foaming organic hydroxylated acid compound containing aliphatic groups in the nucleus.

21. The process of treating mortar-like binding agents to reduce the water-cement factor thereof, which consists in increasing the fluidity of the suspensoids thereof by treating said binding agents with up to approximately 2% by weight, based on the weight of the hydraulic cement, of a non-foaming organic carboxylic acid compound containing at least two hydroxy groups combined by aliphatic groups in the nucleus.

22. The method of treating mortar-like binding agents to reduce the water-cement factor thereof, which consists in increasing the fluidity of the suspensoids thereof by treating said binding agents with up to approximately 2% by weight, based on the weight of the hydraulic cement, of a non-foaming organic carboxylic acid compound containing aliphatic groups and at least two hydroxy groups in the nucleus and capable of producing at least two salts of the alkaline earths with different pH values.

23. The process of treating mortar-like binding agents to reduce the water-cement factor thereof, which consists in increasing the fluidity of the suspensoids thereof by treating said binding agents in the presence of an oxidizing agent with up to approximately 2% by weight, based on the weight of the hydraulic cement, of a non-foaming organic hydroxylated acid compound containing aliphatic groups in the nucleus.

24. The process of treating mortar-like binding agents to reduce the water-cement factor thereof, which consists in increasing the fluidity of the suspensoids thereof by treating said binding agents in the presence of an oxidizing agent with up to approximately 2% by weight, based on the weight of the hydraulic cement, of a non-foaming organic carboxylic acid compound containing at least two hydroxy groups combined by aliphatic groups in the nucleus.

25. The method of treating mortar-like binding agents to reduce the water-cement factor thereof, which consists in increasing the fluidity of the suspensoids thereof by treating said binding agents in the presence of an oxidizing agent with up to approximately 2% by weight, based on the weight of the hydraulic cement, of a non-foaming organic carboxylic acid compound containing aliphatic groups and at least two hydroxy groups in the nucleus and capable of producing at least two salts of the alkaline earths with different pH values.

26. The process of treating mortar-like binding agents to reduce the water-cement factor thereof, which consists in increasing the fluidity of the suspensoids thereof by treating said binding agents in the presence of salts of acids forming difficultly soluble salts of calcium with up to approximately 2% by weight, based on the weight of the hydraulic cement, of a non-foaming organic hydroxylated acid compound containing aliphatic groups in the nucleus.

27. The process of treating mortar-like binding agents to reduce the water-cement factor thereof, which consists in increasing the fluidity of the suspensoids thereof by treating said binding agents in the presence of salts of acids forming difficultly soluble salts of calcium with up to approximately 2% by weight, based on the weight of the hydraulic cement, of a non-foaming organic carboxylic acid compound containing at least two hydroxy groups combined by aliphatic groups in the nucleus.

28. The process of treating mortar-like binding agents to reduce the water-cement factor thereof, which consists in increasing the fluidity of the suspensoids thereof by treating said binding agents in the presence of salts of acids forming difficultly soluble salts of calcium with up to approximately 2% by weight, based on the weight of the hydraulic cement, of a non-foaming organic carboxylic acid compound containing aliphatic groups and at least two hydroxy groups in the nucleus and capable of producing at least two salts of the alkaline earths with different pH values.

29. The process of treating mortar-like binding agents to reduce the water-cement factor thereof, which consists in increasing the fluidity of the suspensoids thereof by treating said binding agents in the presence of oxalates with up to approximately 2% by weight, based on the weight of the hydraulic cement, of a non-foaming organic hydroxylated acid compound containing aliphatic groups in the nucleus.

30. The process of treating mortar-like binding agents to reduce the water-cement factor thereof, which consists in increasing the fluidity of the suspensoids thereof by treating said binding agents in the presence of oxalates with up to approximately 2% by weight, based on the weight of the hydraulic cement, of a non-foaming organic carboxylic acid compound containing at least two hydroxy groups combined by aliphatic groups in the nucleus.

31. The method of treating mortar-like binding agents to reduce the water-cement factor thereof, which consists in increasing the fluidity of the suspensoids thereof by treating said binding agents in the presence of oxalates with up to approximately 2% by weight, based on the weight of the hydraulic cement, of a non-foaming organic carboxylic acid compound containing aliphatic groups and at least two hydroxy groups in the nucleus and capable of producing at least two salts of the alkaline earths with different pH values.

32. The process of treating mortar-like binding agents to reduce the water-cement factor thereof, which consists in increasing the fluidity of the suspensoids thereof by treating said binding agents with up to approximately 2% by weight, based on the weight of the hydraulic cement, of a saccharic acid compound.

33. The process of treating mortar-like binding agents to reduce the water-cement factor thereof, which consists in increasing the fluidity of the suspensoids thereof by treating said binding agents with up to approximately 2% by weight, based on the weight of the hydraulic cement, of saccharic acid.

34. Mortar-like binding agents containing up to approximately 2% by weight, based on the weight of the hydraulic cement, of a saccharic acid compound and having a water-cement factor approximately 15%–20% less than that of mortars and like binding agents prepared without the said saccharic acid compound.

35. Mortar-like binding agents containing up to approximately 2% by weight, based on the weight of the hydraulic cement, of saccharic acid and having a water-cement factor approximately 15%–20% less than that of mortars and like binding agents prepared without the said saccharic acid.

KASPAR WINKLER.